United States Patent [19]
Keller et al.

[11] Patent Number: 5,377,335
[45] Date of Patent: Dec. 27, 1994

[54] MULTIPLE ALTERNATE PATH PIPELINED MICROSEQUENCER AND METHOD FOR CONTROLLING A COMPUTER

[75] Inventors: Howard J. Keller, Carlsbad; Christopher E. Smith, El Toro; Robert L. Noble, Lake Elsinore, all of Calif.

[73] Assignee: Unisys Corporation, Blue Bell, Pa.

[21] Appl. No.: 752,817

[22] Filed: Aug. 30, 1991

[51] Int. Cl.$^5$ .............................................. G06F 9/26
[52] U.S. Cl. .................................................... 395/375
[58] Field of Search ......................... 395/375, 800, 325

[56] References Cited

U.S. PATENT DOCUMENTS

| | | | |
|---|---|---|---|
| 3,959,783 | 5/1976 | Fressineau et al. | 365/200 |
| 4,373,180 | 2/1983 | Linde | 395/375 |
| 4,493,019 | 1/1985 | Kim et al. | 395/375 |
| 4,551,798 | 11/1985 | Horvath | 395/375 |
| 4,571,673 | 2/1986 | Horst et al. | 395/375 |
| 4,574,344 | 3/1986 | Harris et al. | 395/375 |
| 4,587,611 | 5/1986 | Amdahl et al. | 395/375 |
| 4,670,835 | 1/1987 | Kelly et al. | 395/575 |
| 4,685,058 | 8/1987 | Lee et al. | 395/375 |
| 4,802,088 | 1/1989 | Rawlingston et al. | 395/700 |
| 4,812,970 | 3/1989 | Kitamura et al. | 395/375 |
| 5,124,910 | 6/1992 | Koumoto et al. | 395/375 |
| 5,148,532 | 9/1992 | Narita et al. | 395/375 |

Primary Examiner—Parshotam S. Lall
Assistant Examiner—Viet Vu
Attorney, Agent, or Firm—J. Ronald Richebourg; Mark T. Starr; Stanton D. Weinstein

[57] ABSTRACT

An alternate path selection structure is provided which reduces the effects of aborting an operation. The present invention comprises a structure and method that allows efficient retrieval of alternate paths to pursue in a microcode sequence. The present invention is useful in a computer system having a central processing unit, input/output units and a memory unit, each of which include means for generating condition signals indicative of the current status thereof, wherein the central processing unit includes a microsequencer comprising storage means for storing microinstructions for the central processing unit, the input/output units and the memory unit; means for storing the last microinstruction retrieved from the storage means; means for generating an alternate address to the storage means in response to the condition signals; means for producing an abort signal also in response to the condition signals; and, means for selecting either the microinstruction retrieved from the storage means or the last microinstruction in the means for storing in response to the state of the abort signal.

6 Claims, 4 Drawing Sheets

| CLOCK PERIOD | 1 | 2 | 3 | 4 | 5 | 6 | 7 | 8 | 9 |
|---|---|---|---|---|---|---|---|---|---|
| ECSA0 | A1 | B1 |  | C1 |  |  | D1 |  | C1 |
| STAGE 1 |  | A1 | A2 | B1 | B2 | B3 | C1 | B4 | B5 |
| ECSA1 |  | ->A1 | ->A2 | ->B1 | ->B2 | ->B3 | ->C1 | ->B4 | ->B5 |
| LATCHES |  | -- | 'A2' | -- | 'B2' | 'B3' | 'B3' | 'B4' | 'B5' |
| NA1 |  | ->A2 | -- | ->B2 | ->B3 | ->B4 | ->C2 | ->B5 | ->B6 |
| MSEQ | IA | NA | IA | NA | NA | IA | NA | NA | IA |
| STAGE 2 |  |  | A1 | A2 | B1 | B2 | B3 | -- | B4 |
| NA2 |  |  | ->A2 | -- | ->B2 | ->B3 | ->B4 | ->C2 | ->B5 |
| ABORT |  |  |  |  |  |  | XXXX |  |  |

NOTATION:

A1 => THE FIRST MICRO-INSTRUCTION OF OPERATOR A

A2 => THE SECOND MICRO-INSTRUCTION OF OPERATOR A

->B2 => ADDRESS POINTING TO SECOND U-INSTRUCTION OF OPERATOR B

'B4' => FAMILY OF MOD 4 ALTERNATE MICRO- INSTRUCTIONS INCLUDING LOCATION B4

NOTE A IS A 2 CLOCK OP WITH UNCONDITIONAL END-OF-OP. B IS NORMALLY 3 CLOCK OP WHICH ABORTS LAST INSTRUCTION.

FIG. 7

MULTIPLE ALTERNATE PATH PIPELINED MICROSEQUENCER AND METHOD FOR CONTROLLING A COMPUTER

BACKGROUND OF THE INVENTION

1. Field Of The Invention

The invention relates to control in a computer system and, more particularly, to a distributed pipeline microsequencer structure and method for controlling the computer.

2. Background Of The Invention

Pipelining an execution data path is one of several techniques to improve overall performance of a computer system. This results in a reduction of the amount of functionality that is required at any given stage in the computer, thus allowing higher clock speeds and therefore higher performance. A problem in pipelining is the latency that occurs when the pipeline flow is broken. The deeper the pipe, the greater the latency. Much effort is placed in assuring that pipeline breaks are minimized by proper structuring of microcode, but this technique is not always effective.

In a microcoded execution unit, the various functional structures, such as adders and data rotators, are controlled by specific control fields within the microcode word. A microcode word is used for controlling a single step of a complex computation algorithm such as an arithmetic divide. A complex algorithm may consist of many microcode words that are executed in some specific order to accomplish the algorithm. The execution of this algorithm requires both the serial execution of groups of microcode words and, in many cases, a choice of an alternate sequence as a function of some dynamic condition of the data. This change in sequencing creates the pipeline breaks and resultant latency delays.

An individual microcode word contains information in predefined fields that will cause certain operations to occur in the data path structures of the computer at the specific machine cycle time that the microcode word is executed. To specify the next microcode word to be executed, a defined field within a microcode word will contain the address of the location in the control store that contains the next sequential microcode word. As each microcode word is executed, its corresponding next address field provides the address within the control store that contains the next sequential microcode word to be executed. This field will automatically be utilized to access and provide the next microcode word for the next machine cycle.

A complex instruction-set microcoded computer executes the high level operators by executing a sequence of microcode words. This process is normally initiated by a code evaluation unit within the computer examining and providing an initial address of the microcode word sequence to the first stage of the microsequencer. At the termination of a microcode sequence, a mechanism is required to allow a request to be made for the initial address associated with the microcode word sequence of the next-to-be-executed high level operator.

The execution of an algorithm designed to execute a high level computer instruction utilizes both the sequential execution of microcode words and conditional execution of alternate sequences of microcode words as a function of dynamic data conditions. The penalty for aborting a pipeline can be quite severe and negate much of the performance improvement achieved by the pipeline.

SUMMARY OF THE INVENTION

An alternate path selection structure is provided which reduces the effects of aborting an operation. The present invention comprises a structure and method that allows efficient retrieval of alternate paths to pursue in a microcode sequence.

"The present invention is useful in a computer system having a central processing unit, input/output units and a memory unit, each of which include means for generating condition signals indicative of the current status thereof, wherein the central processing unit includes a microsequencer comprising means for producing an abort signal in response to the condition signals; a first stage control store including first storage means disposed for storing j subfields of microinstructions for the central processing unit, the input/output units and the memory unit; means for storing j microinstructions retrieved from the storage means, and j means for selecting either the microinstruction retrieved from the first storage means or the last microinstructions in the means for storing in response to the state of the abort signal. The microsequencer further comprises multiplexing means having j sets of inputs coupled to the j means for selecting, respectively, a set of outputs and select input terminals. Further, register means are disposed which have a set of inputs coupled to outputs of the multiplexing means and a set of outputs. A second stage control store is provided which includes a second storage means disposed for storing second subfields of microinstructions for the central processing unit, the input/output units and the memory unit, and having input terminals coupled to the outputs of the register means; and means for generating an alternate address to the first control store in response to the condition signals and having outputs coupled to the select input terminals of the multiplexing means."

Moreover, the present invention provides a method of controlling alternate paths of a microcode sequence including the steps of retrieving microinstructions stored in a storage means, where the microinstructions are provided for controlling the computer system; storing the last microinstruction retrieved from the storage means in a means for storing; generating an alternate address to the storage means in response to the condition signals; producing an abort signal also in response to the condition signals; and, selecting either the microinstruction retrieved from the storage means or the last microinstruction in the means for storing in response to the state of the abort signal.

BRIEF DESCRIPTION OF THE DRAWINGS

FIG. 7 is a timing diagram that illustrates an exemplary operation of the Microsequencer.

DETAILED DESCRIPTION

Figure 1:
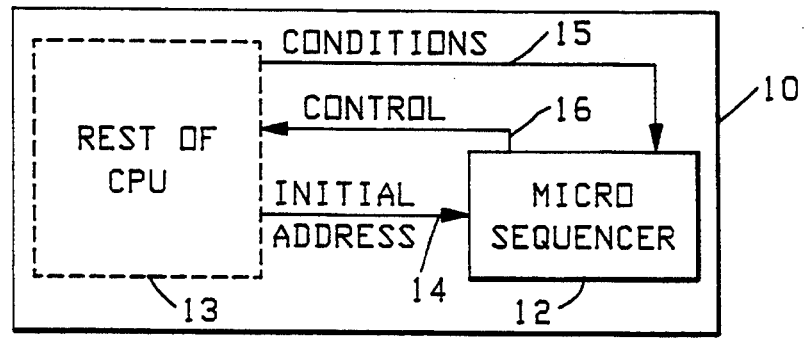
FIG. 1 is a simplified block diagram of a central processing Unit (CPU) with the Microsequencer of this invention broken out to show the interrelationship therebetween.

Referring now to the drawings and in particular to FIG. 1, a simplified block diagram of a central processing unit (CPU) system 10 is shown. Microsequencer 12 of this invention is shown separately to illustrate the interrelationship between it and the CPU 13. An Initial Address and signals indicative of CPU conditions ("Conditions") are supplied to the Microsequencer 12 from the CPU 13 on lines 14 and 15, respectively. As will be described in greater detail hereinbelow, the Microsequencer 12 responds to the Initial Address and Conditions from the CPU 13 and generates Control signals that are supplied on lines 16 back to the CPU 13.

Figure 2:
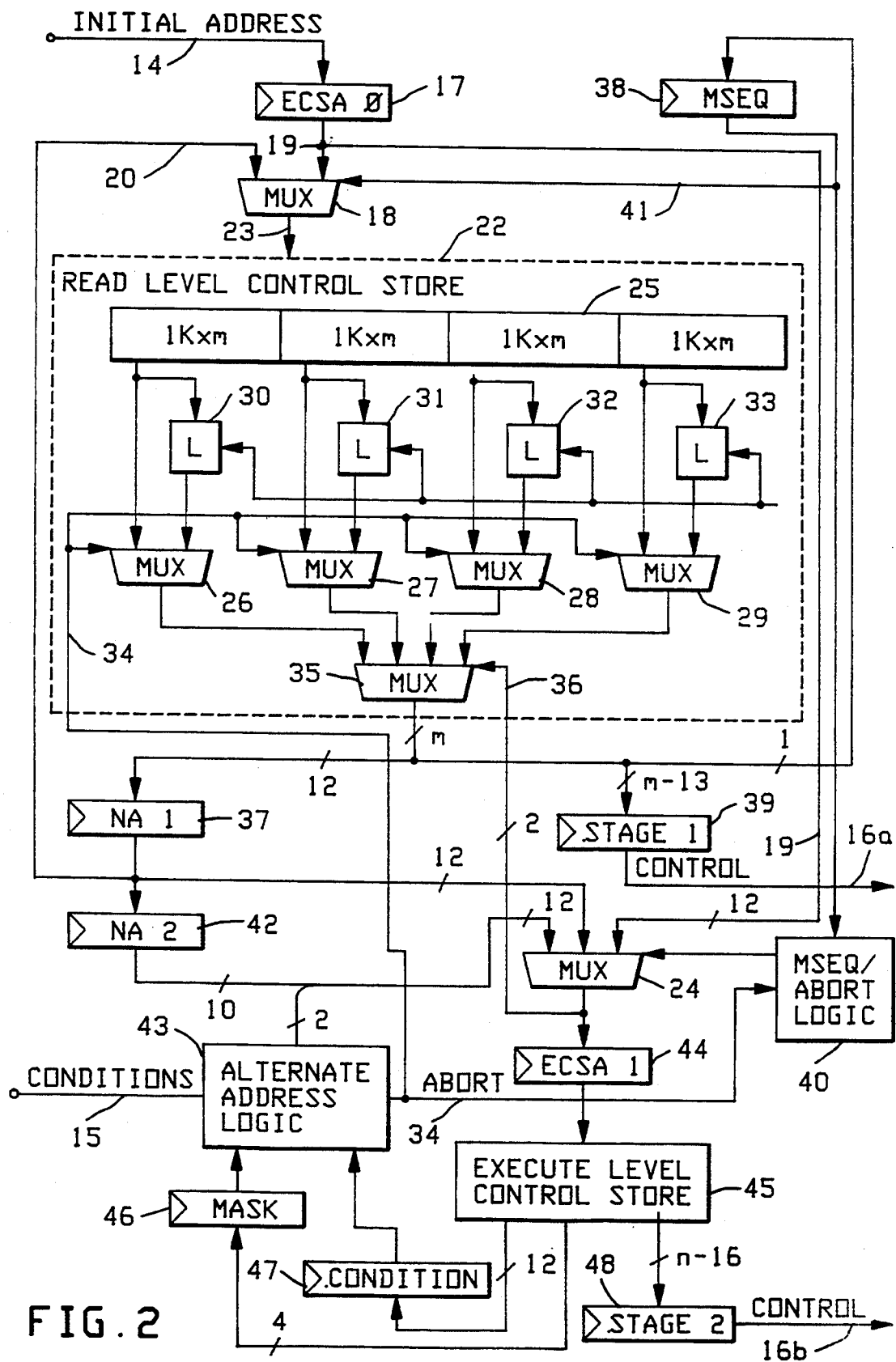
FIG. 2 is a detailed block diagram of the Microsequencer of this invention.

FIG. 2 illustrates in greater detail the structure of the Microsequencer 12, wherein the initial address of a microcode sequence is supplied on lines 14 to the input terminals of a register 17 entitled "Execute Control Store Address Zero" (ECSAO). The address disposed at the output terminals of the ECSAO register 17 are provided to one-half of the input terminals of a two-way multiplexor 18 by means of lines 19. The second half of the input terminals of the multiplexor 18 is supplied from a feedback loop on lines 20, which will be explained further hereinbelow.

The output of the multiplexor 18 is supplied to a Read Level Control Store (RLCS) 22 on lines 23. The RLCS 22 includes a 4K×m memory 25 (arranged in four 1K×m bit sections). The lines 19 are also coupled to one-third of the input terminals of a three-way multiplexor 24, which will be explained further hereinbelow.

The outputs of the memory 25 are provided in four sets of m outputs per set arranged in parallel and coupled to one-half of each of four two-way multiplexors 26–29, respectively, and to latches 30–33. The output terminals of latches 30–33 are coupled to the second half of the input terminals of the multiplexors 26–29, respectively.

An Abort signal line 34, which will be amplified further hereinafter, is coupled to the selector input terminals of the multiplexors 26–29. The output terminals of the multiplexors 26–29 are coupled to input terminals of a four-way multiplexor 35, respectively. Accordingly, when an operation Abort occurs, the previous state retrieved from the memory 25 is disposed at the input terminals of the multiplexor 35.

The multiplexor 35 selects one of four sets of m bits from one of the multiplexors 26–29 in response to the output of the multiplexor 24 on line 36. In one embodiment of the present invention, twelve of the output terminals of the multiplexor 35 are coupled to Next Address One (NA1) register 37; one of the output terminals is coupled to a Microsequencer (MSEQ) register 38; and the remaining m-13 output terminals are coupled to a Stage One register 39. The output terminals of the register 39 are coupled to part of the control lines 16, which are hereinafter designated 16a. The output terminal of the MSEQ register 38 is coupled on line 41 to an input terminal of an MSEQ/ABORT logic 40, to the control input of the multiplexor 18, and to the control inputs of the latches 30–33, which enables loading of these latches. It is the function of the single bit stored in the MSEQ register 38 to determine if ensuing microcode states are to be retrieved from the RLCS 22, or if a new Initial Address for a new microcode sequence is to be accepted from the ECSAO register 17.

Referring again to the NA1 register 37, the output terminals thereof are coupled to the second half of the input terminals of the multiplexor 18 on lines 20, to a Next Address 2 (NA2) register 42 and to a second one-third of the input terminals of the multiplexor 24. The output terminals of an Alternate Address logic 43 are combined with the output terminals of the register 42 to form one of the selectable inputs to the multiplexor 24. The logic 43, which in one embodiment comprises a programmable logic array (PLA), generates output signals as a function of conditions; such as, for example, the sequential flow of microcode sequences that may from time to time be modified by dynamic conditions that are occurring within the CPU 10. The Alternate Address logic 43 determines an alternate microcode sequence for response to these dynamic conditions. Moreover, the Abort signal is generated in the logic 43 and supplied on line 34, which is also coupled to an input terminal of the MSEQ/Abort logic 40. The logic 43 will be amplified in greater detail hereinbelow in conjunction with the description of FIG. 3.

The output terminal of the logic 40 is coupled to the selector input terminals of the multiplexor 24, such that a selection of one of the three sets of inputs is provided at the output terminals as a function of the sequencing bit from the MSEQ register 38, and the Abort signal on the line 34 from the logic 43. The operation of this structure will be described further hereinbelow.

The output of the multiplexor 24 is coupled to an Execute Control Store Address One (ECSA1) register 44, which, in turn, has output terminals coupled to input terminals of an Execute Level Control Store (ELCS) 45. The ELCS 45 comprises a 4K×n memory array, and is structured the same as the RLCS 22, but without the latches 30–33 and multiplexors 26–29 and 35. The two least significant bits of the output of the multiplexor 24 are transmitted by means of lines 36 to the selector input terminals of the multiplexor 35.

In one embodiment of this invention, four of the output terminals of ELCS 45 are coupled to a Mask register 46 and the output terminal thereof is coupled to four input terminals of the logic 43. Twelve more of the output terminals of the ELCS 45 are coupled to a Condition register 47 and the output thereof is coupled to twelve more input terminals of the logic 43. The remaining n-16 output terminals of the ELCS 45 are coupled to input terminals of a Stage 2 register 48. The output terminals of the register 48 are coupled to the remaining control signal lines 16, and are identified hereinbelow as 16b. It is pointed out that lines 16a and 16b form the lines 16 as shown in FIG. 1. The Condition lines 15 are coupled to the remaining input terminals of the logic 43, which will be amplified in greater detail hereinbelow in conjunction with a description of FIG. 4.

Figure 3:
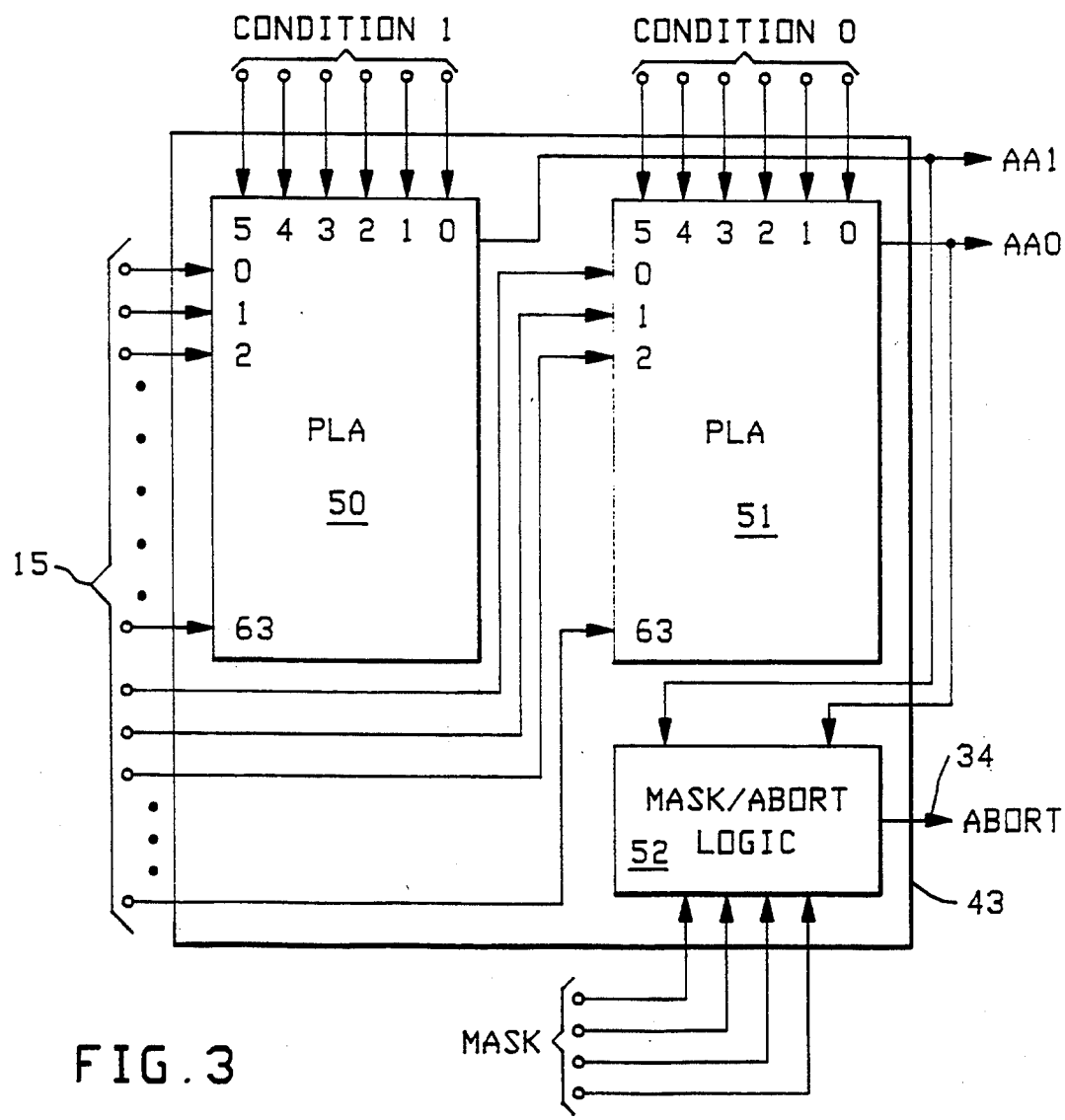
FIG. 3 is a detailed block diagram of the Alternate Address logic of the Microsequencer.

Referring now to FIG. 3, a block diagram of the details of the Alternate Address logic 43 are illustrated. In one embodiment one-half (e.g., 64) of the condition lines 15 are coupled to input terminals of a PLA (programmable logic array) 50. The second half (e.g., 64) of the condition lines 15 are coupled to input terminals of a second PLA 51. The output of the Condition register 47 (FIG. 2) are divided between additional input terminals of the PLAs 50 and 51. The outputs of the PLAs 50 and 51 are disposed for connection to multiplexor 24 (FIG. 2), and are also coupled to Mask/ABORT logic 52. The outputs of the Mask register 46 are coupled to additional input terminals of the logic 52. The output of the logic 52 is coupled to the line 34, which transmits the Abort signal.

The condition signals supplied on the lines 15 from the CPU 10, which are to be examined, are provided on 64 unique input terminals of each PLA 50, 51. The condition select fields from the control store 45 are supplied from the Condition register 47 (FIG. 2) to a set of input terminals of the PLAs. The output of the PLAs each provide 1 bit of the Alternate Address (AA). The AA bits will be utilized as the index into the Mask field to determine the preferred path, and also as an address modifier if a microcode Abort must be executed. The truth table below illustrates a portion of the logical implementation of one of the PLAs. This table shows four of the condition inputs (C3–C0), three of the condition select inputs (A2–A0) from the microcode word 6-bit Condition 0 field and the resulting Alternate Address bit. Note in this table that the condition select bits (A2–A0O) act as an encoded select field to select one of the condition signals (C3–C0). A logical 1 on AAO indicates that the selected condition is a logical 1.

TABLE I

| C3 | C2 | C1 | C0 | A2 | A1 | A0 | AA0 |
|---|---|---|---|---|---|---|---|
| 1 | 0 | 0 | 0 | 0 | 0 | 1 | 0 |
| 0 | 0 | 0 | 1 | 0 | 1 | 0 | 0 |
| 1 | 0 | 1 | 0 | 0 | 0 | 1 | 1 |
| 0 | 0 | 1 | 1 | 0 | 1 | 0 | 0 |
| 1 | 1 | 0 | 0 | 0 | 1 | 0 | 1 |
| 0 | 1 | 0 | 1 | 0 | 0 | 0 | 1 |
| 1 | 1 | 1 | 0 | 0 | 1 | 1 | 1 |
| 0 | 1 | 1 | 1 | 1 | 0 | 1 | 0 |

Where, for example:
  C0 $\leftarrow$ AREG TAG = 2
  C1 $\leftarrow$ BREG EXPONENT = 0
  C2 $\leftarrow$ ALU CARRY OUT = 1
  C3 $\leftarrow$ CREG [40:3] = 5

Figure 4:
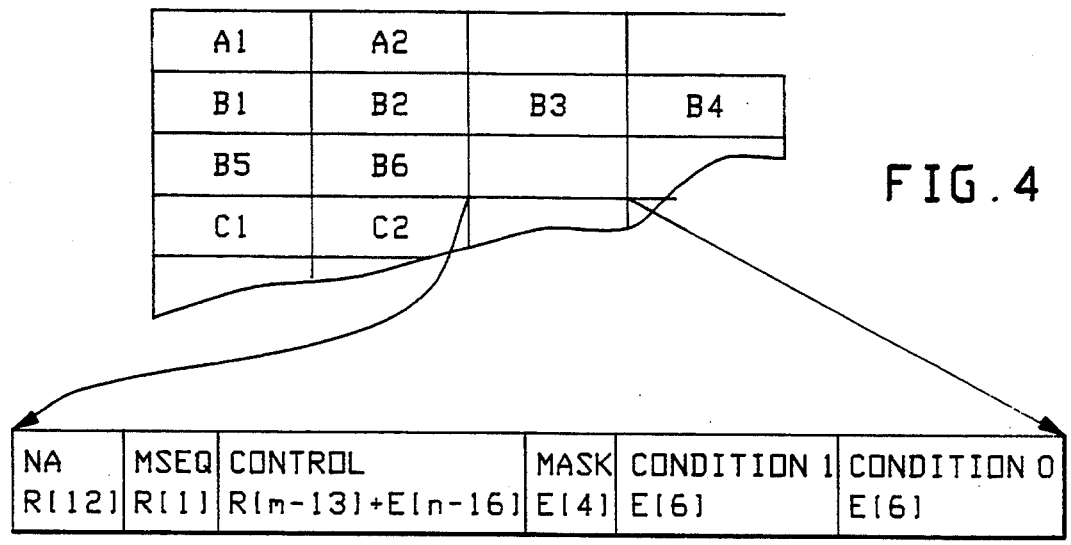
FIG. 4 is a diagram showing an exemplary organization of microinstructions stored in the Read Level Control Store or the Execute Level Control Store.

A conditional selection of an alternate path based on dynamic data conditions in this embodiment provides the ability to select one of four alternate microcode paths. All possible conditions that may occur in the high level instruction set hardware are detected by hardwired logic gates at the most primitive level. The important combinations of these primitive conditions occupy positions in two tables that are addressed by two separate fields in the microcode word. In this embodiment, these are known as Condition 0 and Condition 1 as shown in FIG. 4. The combination of these two fields allows for a maximum of four possible alternate paths of microcode execution.

The MASK field of the microcode word, as shown in FIG. 4, is a four-bit field that specifies which of the four possible condition combinations are considered "preferred". A preferred condition specifies that the execution path indicated by the next address (NA) field is most likely to be executed due to the dynamic conditions at that time. Each of the Condition select fields specifies one of 64 possible conditions which the microcode word can test. The result of testing the two conditions selected by the two-condition select fields produces a two-bit integer binary number that is utilized as an index into the four-bit MASK field. If the associated bit in the MASK field is a logical 1 then the NA field specified in the microcode word is the preferred path, which specifies the proper next sequential microcode word to be executed. If the indexed bit in the MASK is a logical 0 then the path followed was incorrect and should be aborted. Each bit of logical value 1 in the MASK field identifies a condition test combination indicating the test passed, while a logical 0 in the indexed MASK field specifies an aborted combination. It is possible that more than one bit in the MASK be a logical 1. Therefore, there may be multiple conditions that select the "preferred" path.

FIG. 4 also shows a microcode word field named "CONTROL". This CONTROL field represents a number of subfields that are responsible for controlling specific hardware structures at various levels in the execution pipeline.

Logically, it is possible to provide a single control store to provide a stream of microcode words that are sequentially passed down the successive stages of execution. The appropriate subfields of the CONTROL field within the control word would then control appropriate hardware structures at the various stages. An example of this would be the providing of read addresses for a register file at stage (n) of the pipeline, and operation selection control for an Arithmetic logic unit at stage (n+1). In this embodiment, however, it was decided to distribute the single control store structure among the various stages; each staged control store contains only the appropriate fields to control the hardware structures assigned to those stages. There are a number of advantages for doing this. Access time of a control store, whether composed of RAM or ROM, is a function of storage depth and width. Even though the depth is not reduced by the distribution, the width certainly is. Another advantage is that the division of the control store allows for smaller structures that may be placed in closer proximity to the controlled hardware structures. The overall benefit is a reduction of control store access time, thereby improving performance. It should be noted that logically the division of a microcode word does not change the fact that it is still a single word and its functionality is only distributed in time.

The division of the microcode word into physical stages is illustrated in FIG. 4 by the bracketed nomenclature shown with each field of the microcode word. The total width of the microcode word in this embodiment is [m+n] bits where [m] represents the portion of the microcode word assigned to stage 1, and [n] represents the portion of the microcode word assigned to stage 2. As illustrated in FIG. 2, the execution unit in this embodiment consists of three stages; an initial entry stage (ECSAO) register 17, a register file stage (Stage 1 or Read Level) and an execute stage (Stage 2 or Execute Level). The microcode word shown in FIG. 4 illustrates that the Next Address (NA) is a 12-bit field within the Read Level Control Store (RLCS) the Microcode Sequence (MSEQ) is a 1-bit field within the RLCS; the CONTROL field is divided between the RLCS and the Execute Level Control Store (ELCS), m-13 and n-16, respectively. The MASK is a 4-bit field within the ELCS and the two CONDITION fields are 6 bits each within the ELCS.

Figure 5:
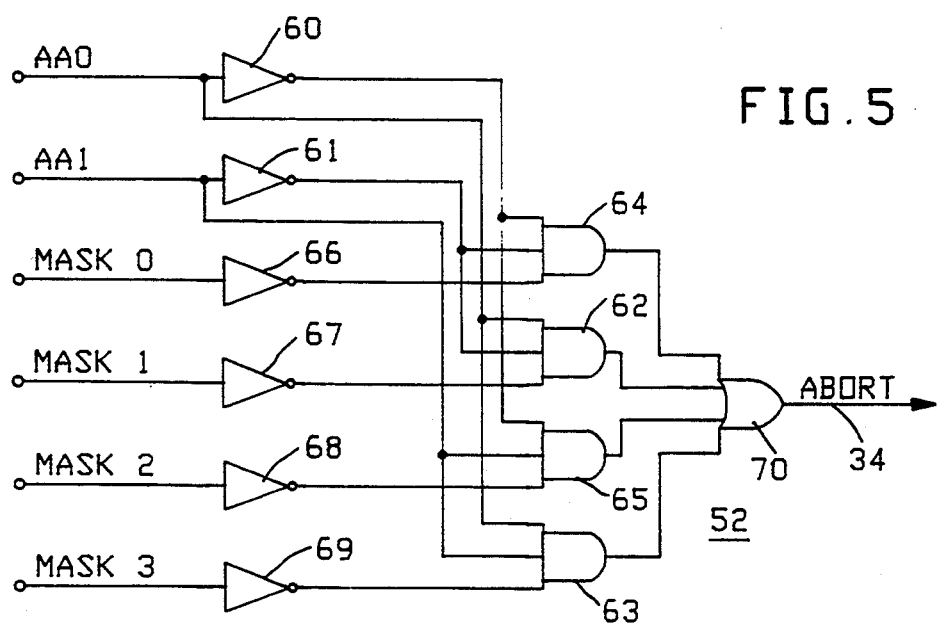
FIG. 5 is a schematic diagram of the Mask/Abort logic.

FIG. 5 illustrates the logical implementation of the MASK/Abort logic of this embodiment. The outputs of the PLAs 50 and 51 (FIG. 3) are denoted herein as AA1 and AA0, and are provided at input terminals of inverters 60 and 61, respectively. Also, the AA0 signal line is coupled to input terminals of AND gates 62 and 63, and the AA1 signal line is coupled to input terminals of AND gates 64 and 65. The four output terminals of the MASK register 46 (identified herein as MASK 0, MASK 1, MASK 2 and MASK 3) are coupled to input terminals of inverters 66-69, respectively. The output terminals of the AND gates 62-65 are coupled to input terminals of an OR gate 70, and the output thereof is coupled to the Abort signal line 34.

The encoded AA value examines a corresponding MASK bit of the microcode word MASK field. If the bit is a logical 0, signifying a nonpreferred path, the Abort signal becomes a logical 1. As an example of operation, assume that due to some combination of conditions, bit AA1 is logically a 1 and bit AA0 is logically a 0. For this case, inverter 61 has a logical 0 output and inverter 60 has a logical 1 output. Also assume that MASK 2 is a logical 1 indicating that a value of 2 on the AA inputs represents a preferred path and therefore no Abort is required. For this combination, inverter 68 will be a logical 0 into AND gate 65. The other inputs to AND gate 65 would be logical 1's due to the AA1 and AA0 combination, but since the third input to AND gate 4 is a logical 0, OR gate 70 is not enabled. It can be shown that all other 3 input AND gates in the network also provide logical 0 levels to the Abort OR gate 70. Due to the characteristics of the OR gate 70, with all inputs at a logical 0, the Abort output is a logical 0.

Figure 6:
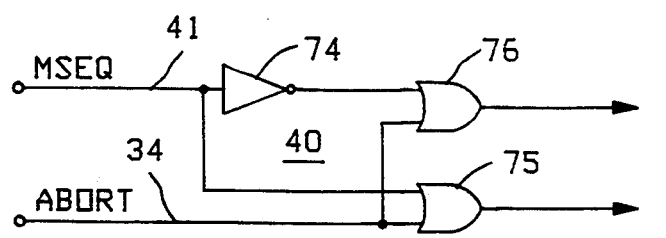
FIG. 6 is a schematic diagram of the MSEQ/ABORT logic.

The MSEQ/Abort logic 40 in FIG. 2 is illustrated in more detail in FIG. 6. The line 41, which transmits the MSEQ bit, is coupled to the input of an inverter 74 and to one of two input terminals of an OR gate 75. The Abort signal line 34 is coupled to the second input of the OR gate 75 and to one of two input terminals of an OR gate 76. The output of the inverter 74 is coupled to the second input of the OR gate 76. The outputs of the OR gates 75 and 76 are coupled to the select input terminals of the multiplexor 24.

Multiplexor 24 of FIG. 2 consists of a three input encoded multiplexor that is used to select the next address (NA) field to be passed through to stage 2 of the pipeline. When an initial address (IA) is to be selected at the end of a microcode word sequence or from the initial start-up state, the path 19 from ESCA0 register 17 is selected. During normal sequencing of microcode words, the output of NA1 register 37 is selected. An abort will cause the NA2 register 42 along with the AA outputs from the Alternate Address logic 43 to be selected. In FIG. 6, inverter 74 provides the inverse of the MSEQ bit to the OR gate 76. The Abort signal is applied to both OR gate 2 and to OR gate 3. Any time the Abort signal is at a logical 1, both outputs are at a logical 1, which will generate an encoded value to select the NA2 register 42 through the multiplexor 24 regardless of the state of the MSEQ bit in the microcode word. It can also be seen that when the Abort signal is a logical 0 and MSEQ is a logical 1, the NA1 register 37 will be selected through the multiplexor 24. And, accordingly, when the Abort signal is a logical 0 and the MSEQ bit in the microcode word is a logical 0, the IA value from ECSA0 register 17 is selected.

A detailed functional description of a typical sequence of microcode words utilizing the invention follows. This example illustrates how the structure handles a conditional abort of the last microcode word of a sequence. The structure is just as effective on a conditional change of direction within a microcode word sequence.

This embodiment of a pipelined distributed microcode sequencer utilizing includes a four-way alternate path mechanism wherein a particular microcode word organization is required within the microcode word control store. As illustrated in FIG. 4, the microcode words are grouped as four-word contiguous blocks in control store and addressable via modulo-4 addresses. The two least significant bits of the address select one-of-four microcode words within a modulo-4 block of microcode words. This organization is important because a block represents the four possible entry points to the four alternate paths. This invention requires that the four alternate path entry points be contained totally within one block; no overlap between blocks is allowed. As a point of interest, if four alternate paths are not required at a particular branch point, it is possible to utilize the unused entry points for any other microcode routine within the control store. This can be done by providing "TRUE" and "FALSE" condition signals for both the Condition 0 and Condition 1 fields of the microcode words. Utilizing these special conditions allows a subset of the alternate paths to be utilized for any particular branch point. This technique is useful for optimal utilization of the available control store space.

For example, FIG. 4 shows an organization of three microcode routines. Each routine consists of one or more microcode words that execute the algorithm of some high level machine operator. In this example, operator A has two microcode words (A1, A2); operator B has six microcode words (B1, B2, B3, B4, B5, B6); operator C has two microcode words (C1, C2). The other unidentified microcode word locations contain microcode words from other routines. This example shows a contiguous sequence of addresses for the microcode words in each routine, but this is not a requirement for the sequential code. Sequential code can be scattered randomly throughout the control store. The only requirement is the need to contain all of the alternate path microcode words associated with a particular branch point within the same block of four microcode words.

FIG. 7 is a timing diagram that illustrates a time verses staging sequence of operations, such as four high-level operators (A, B, C, D) being executed by the sequencer. Time progresses from left to right in terms of clock periods. A clock period represents the propagation of signals from a state element, such as a flip flop or register element, through some arbitrary combinatorial logic to another state element. The change of state of the destination state element due to the action of the combinatorial logic occurs at the trailing edge of the clock period of interest. This sequence is characteristic of a properly designed synchronous computer system. Progression of data and control through the various stages of the pipelined sequencer is represented by a movement from the top of the timing diagram to the bottom. A particular operation would therefore move down and to the right as time progressed.

The MSEQ field of the last microcode word of the previous high-level instruction is stored in the MSEQ register 38. MSEQ, being a logical 0, causes the IA address of the operator A, presently in the ECSA0 register 17, to access the block of four microcode words containing the first microcode word A1 in the RLCS 22. These four microcode words are being presented to the inputs of the latches 30, 31, 32, and 33, and due to the fact that the Abort signal on line 34 is a logical 0, are also presented through multiplexors 26, 27, 28 and 29 into the inputs of multiplexor 35. Since we are in an initial state, the IA for operator A is also being presented to ECSA1 register 44 via the multiplexor 24 and line 19 from the ECSA0 register 17. The two least significant bits of the IA from the multiplexor 24 are being presented via lines 36 to the select terminals of the multiplexor 35, allowing a selection of the microcode word "0" from the multiplexor 26 to the input of the NA1 register 37, the MSEQ register 38 and the stage 1 control register 39. Also during clock period 1, the ECSA0 register 17 is being presented with the IA for the next high-level operator B. Even though the block of four microcode words is being presented to the inputs of the latches 30, 31, 32 and 33, the latches will not be loaded at the end of clock period 1. MSEQ register 38, being a logical 0, will inhibit the loading of these latches. The latches will therefore retain the four alternate microcode words associated with the previous operator microcode sequence.

Considering the states described above, the following actions will occur at the end of clock period 1. The ECSA0 register 17 will be loaded with the IA for operator B, the stage 1 control register 39 will be loaded with the A1 microcode word control fields associated with the stage 1 structures, the ECSA1 register 44 will be loaded with the IA for operator A and will start accessing the ELCS 45, the latches 30, 31, 32 and 33 will not be loaded with all the fields of the stage i microcode words of the first block, the NA1 register 37 will be loaded with the address of the next sequential microcode word of the sequence operator A2, and the MSEQ register 38 will be loaded with a logical 1 indicating that the NA1 register 37 will be the address source of the RLCS 22.

During clock period 2, the various structures of Stage 1 are performing the functions required by the microcode word control fields present in the Stage 1 control register 39. It is important to note that the state changes associated with these operations will not occur until the end of clock period 2. During clock period 2, the data storage structures addressed by the Stage 1 control register 39 are being read allowing data to be loaded into Stage 2 execution registers at the end of clock period 2. During clock period 2, the MSEQ register 38, being a logical 1, selects the next address in the microcode sequence to define the next microcode word to be executed. The MSEQ signal on line 41 is transmitted to the multiplexor 18 which allows the next address field on the line 20 supplied by the NA1 register 37 to address the RLCS 22 allowing the next sequential microcode word, in this case in the same block that was already read out of the RLCS 22, to be applied at the inputs of the state latches 30, 31, 32, 33 and to the multiplexors 26, 27, 28 and 29. Since MSEQ 38 is a logical 1, the latches 30, 31, 32 and 33 are to be loaded with the four-word block of microcode containing microcode word A2 at the end of clock period 2. The multiplexors 26, 27, 28 and 29 transmit therethrough the microcodes to the multiplexor 35 which is controlled by the address signals on the lines 36 from multiplexor 24, which is controlled by the MSEQ/Abort logic 40 to allow selection of the contents of the NA1 register 37. Therefore, during clock period 2, the Stage 1 state of microcode word A2 is read out of RLCS 22 and presented to the inputs of the Stage 1 control register 39. Also during clock period 2, the NA1 register 37 address for microcode word A2 is being presented to the inputs of the ECSA1 register 44. Remembering that the ECSA1 register 44 was loaded at the end of clock period 1 with the A1 microcode word address, the ELCS 45, during clock period 2, is presenting the Stage 2 state to the inputs of the Stage 2 control register 48.

The clock at the end of clock period 2 causes the control signals from the ELCS 45 to be loaded into the Stage 2 control register 48, the read address for microcode word A2 to be loaded into ECSA1 register 44 and the data being read by controls from Stage 1 control register 39 to be loaded into data registers at Stage 2 located within the CPU 13 of FIG. 1. The clock at the end of clock period 2 will also cause the RLCS 22 data associated with the A2 microcode word to be loaded into the Stage 1 control register 39. Since this is the last state of the A microcode sequence, a value of logical 0 loaded into the MSEQ register 38 will indicate that the address source for the RLCS 22 during the next clock period will be an initial address (IA) from the ECSA0 register 17.

During clock period 3, the function that was set up in the Stage 2 control register 48 is occurring. The result of this operation, however, will not be utilized until the clock at the end of clock period 3. Note that the latches 30, 31, 32 and 33 were loaded at the end of clock period 2 with the family of four microcode words containing microcode word A2. Meanwhile, the data and other functions associated with the next microcode word A2 is at Stage 1. The initial address for microcode sequence B in ECSA0 register 17 is being selected by the multiplexor 18 and transmitted therethrough to the RLCS 22. This is the result of the signal on line 41 from the MSEQ register 38 wherein MSEQ is a logical 0.

During clock period 4, Stage 2 is executing the A2 microcode word functions while Stage 1 is executing the B1 microcode word functions. During clock period 5, Stage 2 is executing the B1 microcode word functions while Stage 1 is executing the B2 microcode word functions.

During clock period 6, the microcode word B3 has an MSEQ field, at Stage 1, specifying "End of Operation" and is therefore a logical 0 . The Abort signal is also a logical 0. Therefore, the ECSAO register 17 is selected as the next address source to be transmitted through the multiplexor 24 into the ECSA1 register 44. The most significant 10 bits of the IA for the operator C is selected through the multiplexor 18 into the RLCS 22. This reads the block of four words containing the C1 microcode word. The least significant two bits of the IA from the multiplexor 24 are also placed on lines 36 to select the C1 microcode word through the multiplexor 35. It is important to note that because the MSEQ register 38 contains an IA value of logical 0, the latches 30, 31, 32 and 33 will be inhibited from loading at the end of clock period 6, thereby retaining the family of four alternate paths for the last microcode word of operator B.

The first microcode word for operator C is to be executed next. Considering the pipeline nature of the microsequencer, this means that microcode word C1 will be in the Stage 1 control register 39 during the same clock period that the Stage 2 control register 48 contains the Stage 2 controls for microcode word B3. This scenario is shown in clock period 7, which assumes that microcode word B3 conditionally determines if further operations must be performed to complete operator B, and in this case, further execution of operator B is required. Recall that conditional tests are made in Stage 2 and a non-preferred path will cause the Abort signal to be a logical 1 during clock period 7. The Abort signal is shown as a series of XXXX during clock period 7. The next microcode word that must be executed is B4, not C1.

The state latches 30, 31, 32 and 33 were inhibited from being loaded during clock period 6 by the IA decode from MSEQ 38. Because of this, the latches still contain the family of four microcode words consisting of B1, B2, B3, and B4. Since the four alternate paths were captured in the latches 30, 31, 32 and 33, it will not be necessary to access the RLCS 22 to retrieve the state of the first microcode word of the proper alternate sequence. The Abort signal during clock period 7, being a logical 1, will select the latches 30, 31, 32, 33 through the multiplexors 26, 27, 28 and 29. The MSEQ/Abort logic 40 will select the NA2 register 42 through the multiplexor 24.

The NA2 register 42 contains the ten most significant address bits of the B operator sequence that was staged down from the NA1 register 37 during clock period 6. The two least significant bits of the Abort address will be selected from the Alternate Address logic 43 also via the multiplexor 24. These two bits applied to the multiplexor 35 via the lines 36 will select the proper alternate controls from the latch containing the microcode word B4 into the NA1 register 37, the MSEQ register 38 and the Stage 1 control register 39. The proper address for the alternate microcode sequence is also presented to the inputs of the ECSA1 register 44 from the multiplexor 24. At the end of clock period 7, the Stage 1 control register 39 will be loaded with the control fields from the microcode word B4. The ECSA1 register 44 will be loaded with the address of microcode word B4 and the NA1 register 37 will be loaded with the address of microcode word B5. Note that the latches 30, 31, 32 and 33 will be loaded with the family of four microcode words containing microcode word B4 at the end of clock period 7 because the MSEQ register 38 contains a logical 1.

Another interesting observation is that the ECSAO register 17 was loaded with the IA for instruction D at the end of clock period 6. The Abort signal during clock period 7 notifies the code evaluation unit that feeds IA's to the sequencer that the IA for instruction C must be presented again to the sequencer since an abort of instruction C has occurred.

While a specific embodiment of the present invention has been shown and described hereinabove, modifications and improvements will occur to those skilled in the art. This invention is therefore not limited to the disclosed embodiment. It is intended that the appended claims embrace all modifications which do not depart from the spirit of this invention.

We claim:

1. In a computer system having a central processing unit, input/output units and a memory unit, each of which include means for generating condition signals indicative of the current status thereof, wherein said central processing unit includes a microsequencer comprising:
   a. means for producing an abort signal in response to said condition signals;
   b. a first storage means disposed for storing j microinstructions for controlling said central processing unit, said input/output units and said memory unit;
   c. means for storing last j microinstructions retrieved from said first storage means;
   d. j multiplexing means each having a first set of selectable input terminals coupled to output terminals of said first storage means and a second set of selectable input terminals coupled to output terminals of said means for storing, a set of output terminals and a set of select input terminals;
   e. first multiplexing apparatus having j sets of inputs coupled to respective output terminals of said j multiplexing means, a set of outputs and select input terminals;
   f. first register means having a set of inputs coupled to outputs of said first multiplexing apparatus and a set of outputs;
   g. means for generating an alternate address to said first storage means and a second abort signal in response to said condition signals said second abort signal coupled to said set of terminals of said j multiplexing means;
   h. means for addressing said storage means for receiving a first initial address in response to a first signal at a select input terminal and a second alternate address from outputs of said first register means in response to a second signal at said select input terminal;
   i. second register means having input terminals coupled to output terminals of said first multiplexing apparatus and output terminals coupled to said select input terminals of said means for addressing and to an input terminal of said means for producing said first abort signal;
   j. third register means having inputs coupled to output terminals of said first register means and having a set of output terminals; and,
   k. second multiplexing apparatus having a first set of input terminals coupled to said output terminals of said third register means, a second set of input terminals coupled to outputs of said first register means and a third set of inputs coupled to said first initial address, a select input terminal coupled to said first abort signal, said second multiplexing apparatus outputs one of j alternate microinstructions to output terminals of said microsequencer and other signals to said select input terminals of said first multiplexing apparatus.

2. A computer system as in claim 1 further including a second storage means disposed for storing a second set of microinstructions for said central processing unit, said input/output units and said memory unit, and having input terminals coupled to said outputs of said second multiplexing apparatus, said second storage means having output terminals disposed for providing one of said j microinstructions for execution.

3. A computer system as in claim 1 wherein said means for storing comprises latch means having input terminals coupled to output terminals of said first storage means.

4. A computer system as in claim 1 wherein said 1 multiplexing means have a selecting input terminal disposed for receiving said abort signal whereby one of said j microinstructions retrieved from said first storage means are coupled to output terminals of said microsequencer in response to a first state of said abort signal and and one of said j microinstructions stored in said means for storing in response to a second state of said abort signal.

5. A computer system as in claim 4 wherein said means for storing comprises latch means loadable in response to microsequence bits of said last j microinstructions retrieved from said first storage means.

6. In a computer system having a central processing unit, input/output units and a memory unit, each of which include means for generating condition signals indicative of the current status thereof, a method of controlling alternate paths of a microcode sequence comprising the steps of:

a. retrieving microinstructions stored in a storage means, said microinstructions being provided for controlling said central processing unit wherein said storage means is organized such that for each address applied thereto j microinstructions are retrieved therefrom;

b. storing last j microinstructions retrieved from said storage means in j means for storing coupled in parallel with one another and each having input terminals coupled to output terminals of said storage means;

c. generating an alternate address to said storage means in response to said condition signals;

d. producing an abort signal also in response to said condition signals;

e. multiplexing between the j microinstructions retrieved from said storage means in response to a first state of said abort signal and the last j microinstructions stored in said means for storing in response to a second state of said abort signal; and, f. multiplexing between j microinstructions selected from step in response to data conditions detected.

* * * * *